Patented May 16, 1933

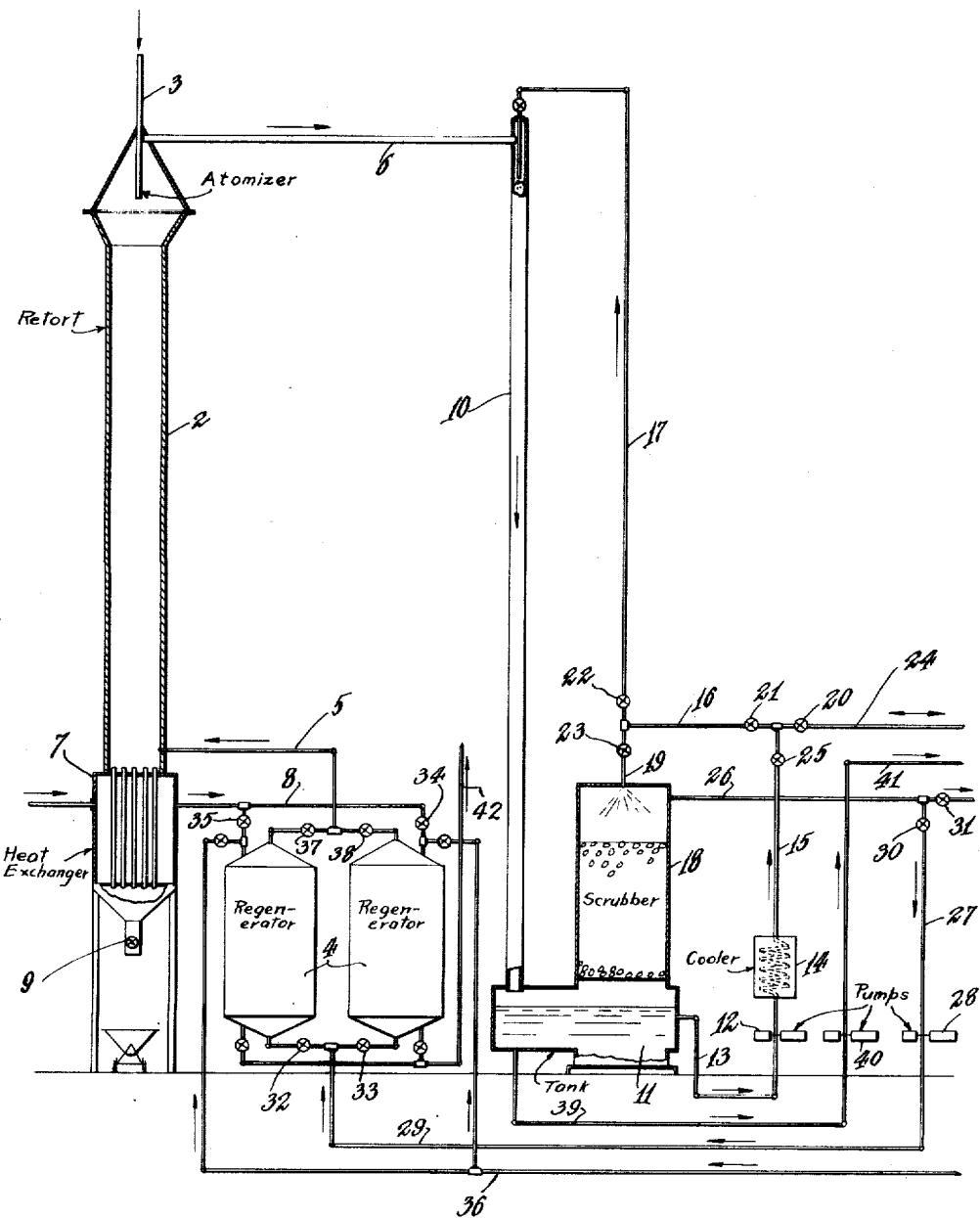

1,909,587

UNITED STATES PATENT OFFICE

JOHN KUHL, OF OAKLAND, AND WILLIAM H. SHIFFLER, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

APPARATUS AND METHOD FOR THE TREATMENT OF RESIDUAL TARS

Application filed May 23, 1928. Serial No. 279,916.

This invention relates to a process of treating residual hydrocarbons and metallic halide compounds resulting from the treatment of hydrocarbon oils with metallic halides. The invention particularly relates to the treatment of residual bodies resulting from the treatment of petroleum oils with metallic halide, and the recovery of valuable products therefrom in a simple, rapid and efficient manner. The invention also relates to an apparatus adapted to be used in the recovery of valuable products from the residue of a metallic halide treatment of petroleum oil.

Although a number of metallic halides may be used in the treatment of hydrocarbon oils, particular reference, for purposes of illustration, will be made in the subsequent description of the process and apparatus to the treatment of residual bodies derived from the treatment of hydrocarbon oils with aluminum chloride.

When aluminum chloride is contacted with mineral oils and subjected to a cracking process, the catalytic properties of the aluminum cholide become progressively exhausted until there remains a semi-solid residue containing hydrocarbons, oxygen compounds and spent aluminum chloride. The hydrocarbons are of the nature of tar, the oxygen compounds are those introduced with the charging stock or formed therefrom or resulting from the presence of air or moisture during the reaction, and the spent aluminum chloride is the original catalyst used in the process. It will be understood that this invention relates to the treatment of residual bodies resulting from the treatment of hydrocarbon oils with aluminum chloride irrespective of the exact temperature and pressure conditions during the catalytic distillation of the hydrocarbon oils or during the formation of the residue.

In a co-pending application Ser. No. 195,649 of which Ralph A. Halloran and William H. Shiffler are the inventors, filed June 1, 1927, there is described a process for converting the solid residue from an aluminum chloride process of treating mineral oils, into a hard coke by means of external heat in a retort provided with means for recovering the gaseous products of carbonization.

In the above and other methods a solid coke in the form of lumps is produced by comparatively slow carbonization.

The coke thus produced is suitable for metallurgical purposes and other limited large scale uses but requires extensive pulverization before it can be combined with a binder in the manufacture of briquets adapted to a wide domestic market. The use of a binder of asphaltic or pitchy material is necessary to form such pulverized coke into suitable shape for handling and to supply a readily combustible material to enable the briquets to be burned in ordinary domestic apparatus.

An object of this invention is to disclose a process for recovering metallic halide suitable for further treatment of oil from spent residual tars derived from a metallic halide process for treating mineral oils.

Another object is to disclose and provide a process of recovering and utilizing gaseous and liquid hydrocarbons from the residual tar from the aluminum chloride treatment of mineral oil.

Another object is to provide a process of treating residual bodies from the aluminum chloride treatment of oils whereby volatile products of decomposition of that portion of the aluminum chloride not recoverable as such from the residual tar may be recovered and collected.

Another object is to disclose a process of manufacturing a coke suitable for commercial purposes or for the further recovery of its alumina contact from the residual bodies resulting from an aluminum chloride treatment of mineral oils.

Another object is to provide a process of collecting the volatile products of decomposition and aluminum chloride from the residual bodies of an aluminum chloride process for treating oil in a continuous cycle and in an efficient and economical manner.

A still further object of this invention is to provide an apparatus adapted to continuously treat tar residues resulting from the metallic halide treatment of hydrocarbon oils.

Another object is to provide an apparatus of high thermal efficiency for the recovery of aluminum chloride, gases and coke from aluminum chloride residues resulting from the treatment of oils with aluminum chloride.

We have discovered that by continuously passing finely divided residual tar from an aluminum chloride treatment of oil either in a pulverized or an atomized condition, countercurrent to highly heated gases in a vertical chamber, the carbonization may be accomplished in a practically instantaneous manner, the vaporized products easily recovered, and the resulting coke secured in powdered form suitable for the manufacture of domestic fuel or for further treatment to recover its alumina content. We have further found that numerous disadvantages encountered in the recovery of valuable products from metallic halide residues may be obviated by treating them in accordance with this invention.

For example, we have found that by recycling a portion of the hydrocarbon gases evolved during the operation, an efficient means of heating is provided, and by generating the reaction temperature separate from the carbonization the decomposition of aluminum chloride by combustion gases is avoided. The process therefore includes the steps of generating heat for carbonization exteriorly of and separately from the carbonizing retort and carbonization in the absence of combustion gases and instead by means of heated, oxygen-lean gases.

The process and apparatus embraced by this invention will be readily understood from a description of a preferred method of carrying out the process in a preferred form of apparatus illustrated in diagrammatic form in the accompanying drawing.

Referring to the drawing, 2 represents a tall vertical retort preferably lined with a refractory brick and other insulating material and provided with a means 3 at the top for introducing pulverized or atomized residual tar or other residual bodies resulting from a metallic halide treatment of mineral oils. Heated gases from the regenerators 4 enter the lower portion of the retort 2 through the line 5 and during their upward passage countercurrent to the finely divided residual tar effect a complete carbonization of the tar particles. The hot gases, together with the vaporized products of the reaction, are carried off through a vapor line 6.

The powdered coke produced by the practically instantaneous carbonization in the retort 2 passes downwardly through a heat exchanger 7 (here shown as a plurality of tubes spaced in an air chamber through which the air for combustion is led to the regenerators 4 by pipe means 8).

The powdered coke gives up a considerable portion of its heat to the air passing through the heat exchanger 7 and is delivered intermittently or continuously through a valved opening 9 provided at the base of the retort.

It will be understood that because of the large surface area of the residual bodies exposed to the heated gases in the retort 2, the extent of the surface area being dependent somewhat upon the degree of subdivision of the residual bodies injected into the retort 2 through the means 3, the heat transfer is exceedingly rapid which makes it possible to efficiently carbonize the residual bodies during the short period of contact of said bodies with heated gases in the retort. The hot gases leaving the retort through the vapor line 6 carry with them vaporized aluminum chloride or other metallic halide present in the residual bodies, hydrogen chloride and hydrocarbons distilled or vaporized from the residual tar. Some aluminum oxide is produced by the decomposition of aluminum chloride and becomes entrained with the powdered coke resulting from this carbonization. The rapid change in temperature of the residual tars supplied to the retort apparently influences the result obtained and the effectiveness of the process may be partially due to this rapid heat exchange.

The mixed gases produced in the retort and discharged therefrom through pipe means 6 are then conducted through a downtake pipe 10 to an oil and tar settling tank 11.

At the same time oil withdrawn from the settling tank by means of a pump 12 and line 13 is passed through a heat exchanger or cooler 14 and then through pipe means 15, 16 and 17 into the top of the down-take pipe 10 wherein it is sprayed so as to condense and wash down certain condensible constituents of the mixed gases including aluminum chloride and other compounds which are thus carried into the settling tank 11. The oil and tar settling tank 11 communicates with a scrubbing tower 18 and uncondensed gases not absorbed by or washed down by the oil sprayed into the down-take pipe 10 pass through the scrubbing tower 18 which may be of any suitable type in which they are contacted during their upward course with cold oil introduced at 19 from sources previously described. Condensible constituents are further reduced to a liquid state in the scrubbing tower 18 in view of the intimate contact with the cold oil and air carried by the cooling oil into the settling tank 11.

Control of the cooling oil is maintained by valve 25 in line 15, valves 20 and 21 in line 16, valve 22 in line 17 and valve 23 near the oil inlet 19. Fresh oil may be supplied to the system through a pipe 24, or said pipe line 24 may be utilized in discharging any accumulated surplus of oil from the settling tank 11 to storage.

Uncondensed gases, essentially hydrocarbons and hydrogen chloride may leave the scrubber 18 through line 26 and may be conveyed to storage where, after any commercial treatment to recover their hydrogen chloride content, they may be utilized for industrial and domestic purposes.

The uncondensed gases may also either before or after the removal of hydrogen chloride be delivered to the regenerators 4 through pipe means 27, pump or blower 28 and line 29. Suitable valves 30, 31, 32 and 33 are provided for directing the flow of gases from the scrubber either to storage or to one or both of the regenerators 4.

Air for combustion in the regenerators is introduced therein through line 8 after passing through the heat exchanger 7 and the admission of the air to either one or both of the regenerators is controlled by suitable valves 34 and 35. Fuel gas from any desired source may be supplied from line 36 to the regenerators and supplies the means for heating the regenerators to the desired temperature. Waste combustion gases may be discharged from the generators 4 through suitable valved outlet lines 42.

The regenerators 4 may be of any desired type or form of construction, but for purposes of illustration, those shown are of the checker brick type. In all cases the regenerators are alternately heated to a temperature of from about 1800° to 2200° F. or well over the volatilization temperature of the metallic halide present in the residual bodies. The uncondensed gases from line 29 are passed through the regenerators wherein their temperature is raised to that of efficient carbonization and they are then delivered from the regenerators through valves 37 and 38 and pipe means 5 into the lower portion of the retort 2, thereby supplying the necessary heat for carbonizing the finely divided residual bodies introduced to the retort through means 3 in accordance with the invention and for the make up of radiation and convection losses.

In the settling tank 11, oil and tar or lighter and heavier hydrocarbon bodies tend to separate by stratification, the oil used in the down-take pipe 10 being withdrawn from the settling tank 11 from the upper portions thereof through pipe 13. The heavy tars or other bodies separating in the settling chamber 11 may be drawn off from the bottom by means of line 39, pump 40 and line 41 to storage or any other place or method of disposal.

We claim:

1. An apparatus for the treatment of tarry residues resulting from an aluminum chloride process of treating petroleum oils comprising a vertical retort, inlet means for introducing tarry bodies in finely divided condition into the upper portion of the retort, inlet means for introducing heated gases into the lower portion of the retort, means for collecting carbonized bodies in the bottom of said retort, a scrubber tower mounted over a settling chamber, discharge means for gases and vaporized products leading from the upper portion of the retort to the scrubber, means for introducing a liquid into the upper portion of the scrubber tower, a separate heating means, discharge means for gases from the upper portion of said tower leading to the heating means, means for discharging gases from said heating means into the retort, a cooler, and means for circulating liquid from the upper portion of the settling chamber through said cooler and into the scrubbing tower.

2. A continuous process of treating tarry bodies from an aluminum chloride process of treating petroleum oils comprising carbonizing tarry bodies in atomized finely divided form during and by means of countercurrent contact with heated gases containing reheated substantially incondensible gases obtained by carbonization of finely divided tarry bodies in the process, said atomized tarry bodies being entirely surrounded and partially suspended in said heated gases during said carbonizing.

3. A continuous process of treating tarry bodies from an aluminum chloride process of treating petroleum oils comprising, carbonizing tarry bodies in finely divided form during and by means of countercurrent contact with heated oxygen-lean gases in a reaction zone, contacting gaseous and vaporized constituents produced during carbonization with oil to condense and absorb a portion of said gases and vaporized constituents, heating uncondensible gases and returning the heated gases to the reaction zone.

4. A continuous process of treating tarry bodies from an aluminum chloride process of treating petroleum oils comprising continuously carbonizing tarry bodies in finely divided form during and by means of counter-current contact with heated gases in a reaction zone, contacting gases and vaporized constituents produced during carbonization with cold oil to condense and absorb condensible constituents, separating uncondensible gases from the oil and condensible constituents heating the uncondensible gases and returning the heated gases to the reaction zone, gravitationally separating the oil and absorbed constituents and reusing a portion of the oil separated from the absorbed constituents in condensing and absorbing further constituents.

5. A continuous process of treating tarry bodies from an aluminum chloride process of treating petroleum oils comprising continuously carbonizing tarry bodies in finely divided form during and by means of countercurrent contact with heated gases in a reaction zone, contacting gases and vaporized constituents produced during carbonization with cold oil to condense and absorb condensible constituents, separating uncondensible gases from the oil and condensible constituents heating the uncondensible gases and returning the heated gases to the reaction zone, gravitationally separating a portion of oil from the oil and absorbed constituents, cooling the separated oil and reusing the cooled oil in condensing and absorbing further constituents.

6. A process of treating residual tarry bodies from an aluminum chloride process of treating hydrocarbon oils, comprising introducing tarry bodies in atomized condition into a reaction zone, converting said tarry bodies into coke and gaseous constituents by passing oxygen-lean gases heated to a temperature sufficient to accomplish said result counter-current to said finely divided tarry bodies in said reaction zone, said atomized tarry bodies being entirely surrounded and partially suspended in said heated oxygen-lean gases during said conversion, removing gaseous constituents from said reaction zone, heating a portion of said gaseous constituents and introducing said heated gaseous constituents into said reaction zone.

Signed at Richmond, California, this 6th day of April 1928.

JOHN KUHL.
WILLIAM H. SHIFFLER.

CERTIFICATE OF CORRECTION.

Patent No. 1,909,587.   May 16, 1933.

JOHN KUHL, ET AL.

It is hereby certified that error appears in the printed specification of the above numbered patent requiring correction as follows: Page 1, line 87, for "contact" read "content"; page 3, lines 85 and 86, claim 2, strike out the words "finely divided"; and that the said Letters Patent should be read with these corrections therein that the same may conform to the record of the case in the Patent Office.

Signed and sealed this 26th day of September, A. D. 1933.

(Seal)

F. M. Hopkins
Acting Commissioner of Patents.

constituents produced during carbonization with cold oil to condense and absorb condensible constituents, separating uncondensible gases from the oil and condensible constituents heating the uncondensible gases and returning the heated gases to the reaction zone, gravitationally separating a portion of oil from the oil and absorbed constituents, cooling the separated oil and reusing the cooled oil in condensing and absorbing further constituents.

6. A process of treating residual tarry bodies from an aluminum chloride process of treating hydrocarbon oils, comprising introducing tarry bodies in atomized condition into a reaction zone, converting said tarry bodies into coke and gaseous constituents by passing oxygen-lean gases heated to a temperature sufficient to accomplish said result counter-current to said finely divided tarry bodies in said reaction zone, said atomized tarry bodies being entirely surrounded and partially suspended in said heated oxygen-lean gases during said conversion, removing gaseous constituents from said reaction zone, heating a portion of said gaseous constituents and introducing said heated gaseous constituents into said reaction zone.

Signed at Richmond, California, this 6th day of April 1928.

JOHN KUHL.
WILLIAM H. SHIFFLER.

CERTIFICATE OF CORRECTION.

Patent No. 1,909,587.   May 16, 1933.

JOHN KUHL, ET AL.

It is hereby certified that error appears in the printed specification of the above numbered patent requiring correction as follows: Page 1, line 87, for "contact" read "content"; page 3, lines 85 and 86, claim 2, strike out the words "finely divided"; and that the said Letters Patent should be read with these corrections therein that the same may conform to the record of the case in the Patent Office.

Signed and sealed this 26th day of September, A. D. 1933.

(Seal)

F. M. Hopkins
Acting Commissioner of Patents.

CERTIFICATE OF CORRECTION.

Patent No. 1,909,587.  May 16, 1933.

JOHN KUHL, ET AL.

It is hereby certified that error appears in the printed specification of the above numbered patent requiring correction as follows: Page 1, line 87, for "contact" read "content"; page 3, lines 85 and 86, claim 2, strike out the words "finely divided"; and that the said Letters Patent should be read with these corrections therein that the same may conform to the record of the case in the Patent Office.

Signed and sealed this 26th day of September, A. D. 1933.

(Seal)

F. M. Hopkins
Acting Commissioner of Patents.